United States Patent
Narasimha et al.

(10) Patent No.: US 8,576,965 B2
(45) Date of Patent: *Nov. 5, 2013

(54) METHODS AND SYSTEMS FOR INTERFERENCE CANCELLATION IN MULTI-MODE COEXISTENCE MODEMS

(75) Inventors: Madihally J. Narasimha, San Diego, CA (US); Je Woo Kim, San Diego, CA (US); Nitin Kasturi, San Diego, CA (US); Parvathanathan Subrahmanya, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 459 days.

This patent is subject to a terminal disclaimer.

(21) Appl. No.: 12/831,462

(22) Filed: Jul. 7, 2010

(65) Prior Publication Data

US 2011/0103431 A1 May 5, 2011

Related U.S. Application Data

(60) Provisional application No. 61/256,936, filed on Oct. 30, 2009.

(51) Int. Cl.
*H04B 1/10* (2006.01)
(52) U.S. Cl.
USPC .......................................... 375/350; 375/346
(58) Field of Classification Search
USPC ......... 375/141–142, 144, 148, 147, 219–222, 375/356, 358, 346, 38, 350
See application file for complete search history.

(56) References Cited

U.S. PATENT DOCUMENTS

| | | | |
|---|---|---|---|
| 5,596,600 A * | 1/1997 | Dimos et al. | 375/148 |
| 5,671,247 A * | 9/1997 | Souissi et al. | 375/144 |
| 6,792,267 B1 * | 9/2004 | Backstrom et al. | 455/422.1 |
| 6,975,673 B1 * | 12/2005 | Rouquette | 375/149 |
| 7,433,384 B2 * | 10/2008 | Smee et al. | 375/142 |
| 7,860,476 B1 * | 12/2010 | Karr et al. | 455/296 |
| 2003/0224731 A1 * | 12/2003 | Yamaura et al. | 455/63.3 |
| 2004/0203458 A1 | 10/2004 | Nigra | |
| 2007/0099011 A1 * | 5/2007 | Wilson | 428/457 |
| 2007/0118583 A1 | 5/2007 | Nagasaka | |
| 2007/0184782 A1 | 8/2007 | Sahota et al. | |
| 2007/0184804 A1 | 8/2007 | Robert et al. | |
| 2007/0201536 A1 * | 8/2007 | Nicolas et al. | 375/141 |
| 2008/0039045 A1 | 2/2008 | Filipovic et al. | |
| 2008/0130714 A1 * | 6/2008 | Wilborn et al. | 375/144 |
| 2008/0198909 A1 * | 8/2008 | Tsatsanis et al. | 375/219 |
| 2008/0299935 A1 | 12/2008 | Safarian et al. | |

(Continued)

FOREIGN PATENT DOCUMENTS

WO WO2004114683 A2 12/2004
WO WO2009090400 7/2009

OTHER PUBLICATIONS

International Search Report and Written Opinion—PCT/US2010/054888—ISA/EPO—Feb. 16, 2011.

(Continued)

*Primary Examiner* — Emmanuel Bayard
(74) *Attorney, Agent, or Firm* — QUALCOMM IP Department; James Hunt Yancey, Jr.

(57) ABSTRACT

Certain embodiments of the present disclosure support techniques for interference cancellation in a multi-mode wireless modem that supports coexistence of different radio technologies.

56 Claims, 13 Drawing Sheets

(56) References Cited

U.S. PATENT DOCUMENTS

| | | | |
|---|---|---|---|
| 2009/0010366 A1* | 1/2009 | Wu et al. | 375/346 |
| 2009/0050685 A1 | 2/2009 | Frederick et al. | |
| 2009/0225814 A1* | 9/2009 | Bastug et al. | 375/147 |
| 2009/0233569 A1 | 9/2009 | Wakutsu | |
| 2009/0304095 A1* | 12/2009 | Chauncey et al. | 375/260 |
| 2010/0020235 A1* | 1/2010 | Bouillet | 348/500 |
| 2010/0150286 A1* | 6/2010 | Casabona et al. | 375/346 |
| 2011/0064122 A1* | 3/2011 | Hahm et al. | 375/148 |
| 2011/0105037 A1 | 5/2011 | Narasimha et al. | |
| 2012/0281733 A1* | 11/2012 | Tanaka et al. | 375/148 |
| 2012/0322478 A1* | 12/2012 | Jagger et al. | 455/501 |

OTHER PUBLICATIONS

International Search Report and Written Opinion—PCT/US2010/054886, International Search Authority—European Patent Office—Feb. 16, 2011.

International Search Report and Written Opinion—PCT/US2010/054888, International Search Authority—European Patent Office—Feb. 16, 2011.

Taiwan Search Report—TW099137229—TIPO—Apr. 19, 2013.

* cited by examiner

METHODS AND SYSTEMS FOR INTERFERENCE CANCELLATION IN MULTI-MODE COEXISTENCE MODEMS

CLAIM OF PRIORITY

This application claims the benefit of priority from U.S. Provisional Patent Application Ser. No. 61/256,936, entitled "Methods and Systems for Interference Cancellation in Multi-Mode Coexistence Modems" and filed Oct. 30, 2009, which is assigned to the assignee of this application and is fully incorporated herein by reference for all purposes.

TECHNICAL FIELD

Certain embodiments of the present disclosure generally relate to wireless communications and, more particularly to a method for interference cancellation in multi-mode coexistence modems.

BACKGROUND

A Multi-mode modem can support two or more modem functions. For example, Wireless Wide Area Network (WWAN) radio technologies [e.g., technologies like Global System for Mobile communications (GSM), Code Division Multiple Access (CDMA), Universal Mobile Telecommunications System (UMTS), Long Term Evolution (LTE), Worldwide Interoperability for Microwave Access (WiMAX)], Bluetooth/Wireless Local Area Network (BT/WLAN) radio technology, technology based on Frequency Modulation (FM), and Global Positioning System (GPS) technology can all coexist and operate independently on the same multi-mode modem. In such scenario, a signal transmitted according to a first radio technology (i.e., Mode 1 operation) may cause interference into a signal received according to a second radio technology (i.e., Mode 2 operation) that may be different from the first radio technology. For example, the Wideband CDMA (WCDMA) transmission signal can cause a broadband interference in the GPS receiver operation and desensitize the receiving GPS signal.

The interference may be often generated due to the presence of spur frequency components in outputs of local oscillators (LOs) that perform up and down translations between baseband and radio frequency (RF) signals. This interference may need to be cancelled in order to maintain peak performance in all operation modes.

The typical cause of interference in, for example, multi-mode WAN/GPS modems is the presence of spur frequency components either in the GPS down-converter LO output or in the WAN up-converter LO output. Sources of the spur frequency components can be also: a clock of analog-to-digital converter (ADC), a clock of Temperature Compensated Crystal Oscillator (TCXO) and a clock of frequency modulator (FM) at a transmitter. For example, the ADC clock sourced from RF circuitry can create strong spur frequency components since it requires a higher power clock driver.

One possible solution for canceling the interference in multi-mode modems is to carefully design all hardware components to prevent coupling and improve isolation. However, this is often hard to simulate and test before actual implementation, and sufficient interference cancellation is not guaranteed due to various design uncertainties.

Another possible solution for cancelling the interference in multi-mode modems can be to change the frequency of transmission signal that causes the interference (i.e., changing the aggressor frequency). However, this approach may not always be practical as mobile terminals are often required to transmit in assigned frequency bands.

Yet another solution for cancelling the interference can be to change frequencies of the spur sources so that the interference caused by the spur frequencies fall outside the received signal band. However, there can be unavoidable spur frequencies and interference components generated as the system grows, for example when the standard GPS receiver is extended to operate in a Wideband GPS (WBGPS) mode. In general, if a higher level of system integration is achieved, then more sources of spur frequencies can be present, and therefore it is impractical to change frequencies of a portion of spur sources.

SUMMARY

Certain embodiments of the present disclosure provide a method for wireless communications. The method generally includes receiving a signal of a second radio technology with interference from a transmission signal of a first radio technology, translating the interference into a narrower frequency band to obtain a received signal with narrowband interference, and filtering the received signal with narrowband interference to obtain a signal without the interference.

Certain embodiments of the present disclosure provide an apparatus for wireless communications. The apparatus generally includes logic for receiving a signal of a second radio technology with interference from a transmission signal of a first radio technology, logic for translating the interference into a narrower frequency band to obtain a received signal with narrowband interference, and logic for filtering the received signal with narrowband interference to obtain a signal without the interference.

Certain embodiments of the present disclosure provide an apparatus for wireless communications. The apparatus generally includes means for receiving a signal of a second radio technology with interference from a transmission signal of a first radio technology, means for translating the interference into a narrower frequency band to obtain a received signal with narrowband interference, and means for filtering the received signal with narrowband interference to obtain a signal without the interference.

Certain embodiments of the present disclosure provide a computer-program storage apparatus for wireless communications that includes a memory having one or more software modules stored thereon, the one or more software modules being executable by one or more processors. The one or more software modules generally include instructions for receiving a signal of a second radio technology with interference from a transmission signal of a first radio technology, instructions for translating the interference into a narrower frequency band to obtain a received signal with narrowband interference, and instructions for filtering the received signal with narrowband interference to obtain a signal without the interference.

BRIEF DESCRIPTION OF THE DRAWINGS

So that the manner in which the above-recited features of the present disclosure can be understood in detail, a more particular description, briefly summarized above, may be had by reference to embodiments, some of which are illustrated in the appended drawings. It is to be noted, however, that the appended drawings illustrate only certain typical embodiments of this disclosure and are therefore not to be considered limiting of its scope, for the description may admit to other equally effective embodiments.

DETAILED DESCRIPTION

Figure 1:
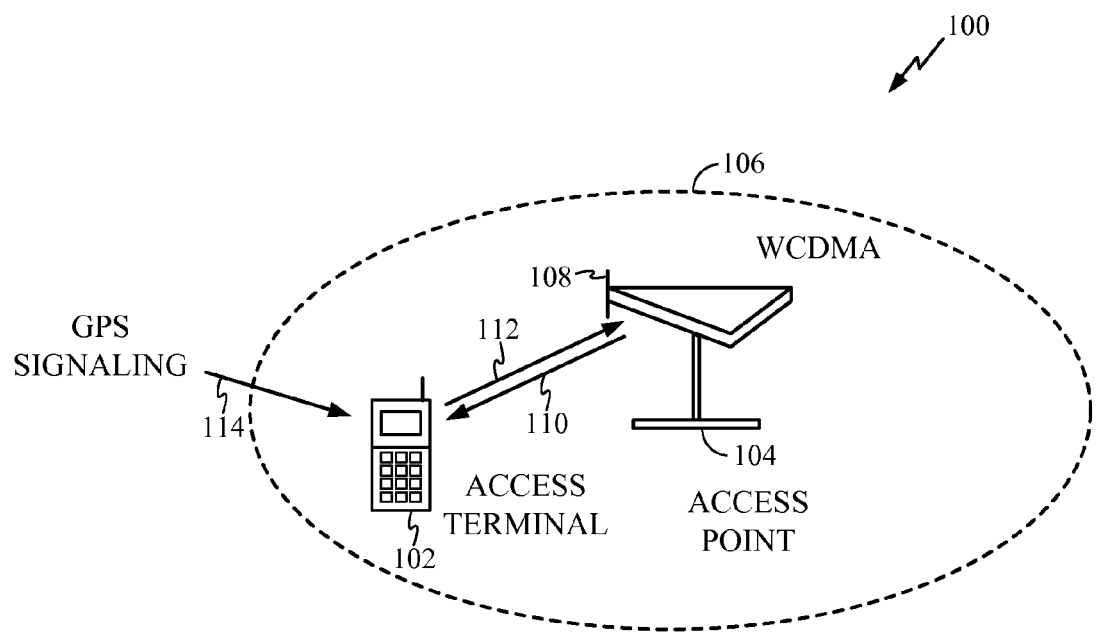
FIG. 1 illustrates an access terminal communicating using different radio technologies for transmission and reception in accordance with certain embodiments of the present disclosure.

Various embodiments of the disclosure are described more fully hereinafter with reference to the accompanying drawings. This disclosure may, however, be embodied in many different forms and should not be construed as limited to any specific structure or function presented throughout this disclosure. Rather, these embodiments are provided so that this disclosure will be thorough and complete, and will fully convey the scope of the disclosure to those skilled in the art. Based on the teachings herein one skilled in the art should appreciate that the scope of the disclosure is intended to cover any embodiment of the disclosure disclosed herein, whether implemented independently of or combined with any other embodiment of the disclosure. For example, an apparatus may be implemented or a method may be practiced using any number of the embodiments set forth herein. In addition, the scope of the disclosure is intended to cover such an apparatus or method which is practiced using other structure, functionality, or structure and functionality in addition to or other than the various embodiments of the disclosure set forth herein. It should be understood that any embodiment of the disclosure disclosed herein may be embodied by one or more elements of a claim.

The word "exemplary" is used herein to mean "serving as an example, instance, or illustration." Any embodiment described herein as "exemplary" is not necessarily to be construed as preferred or advantageous over other embodiments.

Although particular embodiments are described herein, many variations and permutations of these embodiments fall within the scope of the disclosure. Although some benefits and advantages of the preferred embodiments are mentioned, the scope of the disclosure is not intended to be limited to particular benefits, uses or objectives. Rather, embodiments of the disclosure are intended to be broadly applicable to different wireless technologies, system configurations, networks and transmission protocols, some of which are illustrated by way of example in the figures and in the following description of the preferred embodiments. The detailed description and drawings are merely illustrative of the disclosure rather than limiting, the scope of the disclosure being defined by the appended claims and equivalents thereof.

Exemplary Wireless Communication System

The techniques described herein may be used for various broadband wireless communication systems. Examples of such communication systems include Wide Area Network (WAN) systems. The WAN communication systems can be based on various technologies for signal transmission and reception, such as Global System for Mobile communications (GSM), Code Division Multiple Access (CDMA), Wideband CDMA (WCDMA), Universal Mobile Telecommunications System (UMTS), Long Term Evolution (LTE), and Worldwide Interoperability for Microwave Access (WiMAX) technology. The WAN technologies can coexist and operate independently on the same transceiver (i.e., modem) unit along with other communication technologies, such as Bluetooth/Wireless Local Area Network (BT/WLAN) technology, Frequency Modulation (FM) technology and Global Positioning System (GPS) technology.

FIG. 1 illustrates an access terminal 102 communicating in a multiple-access wireless communication network 100 using two different radio technologies for simultaneous transmission and reception in accordance with certain embodiments of the present disclosure. The access terminal 102 may communicate with an access point 104 of a wireless system 106 that may be based, for example, on the WCDMA technology. The access point 104 may be equipped with one or more antennas 108. In the same time, the access terminal 102 may receive signaling in accordance with, for example, the GPS technology, as illustrated in FIG. 1.

In general, a forward link (or downlink) refers to a communication link from an access point to an access terminal, and a reverse link (or uplink) refers to a communication link from an access terminal to an access point. As illustrated in FIG. 1, the access terminal 102 may receive information from the access point 104 over a forward link 110 according to, for example, the WCDMA technology. A reverse link 112 may be used to transmit information from the access terminal 102 to the access point 104 using, for example, the same WCDMA technology.

The communication over the reverse link 112 may be performed in the same time as the reception of a signal over a communication link 114, wherein the signal received at the access terminal 102 over the link 114 may be based on different radio technology than the signal transmitted over the reverse link 112. For example, the signal received over the link 114 may be based on the GPS technology, as illustrated in FIG. 1. Due to the simultaneous transmission and reception of signals belonging to different radio technologies, interference of these signals may occur at the access terminal 102 having negative effects on its performance.

The access point 104 may be a fixed station used for communicating with access terminals and is also referred to as base station, Node B or some other terminology. The access terminal 102 is also referred to as user equipment (UE), wireless communication device, terminal, cell phone, mobile telephone or some other terminology.

Figure 2:
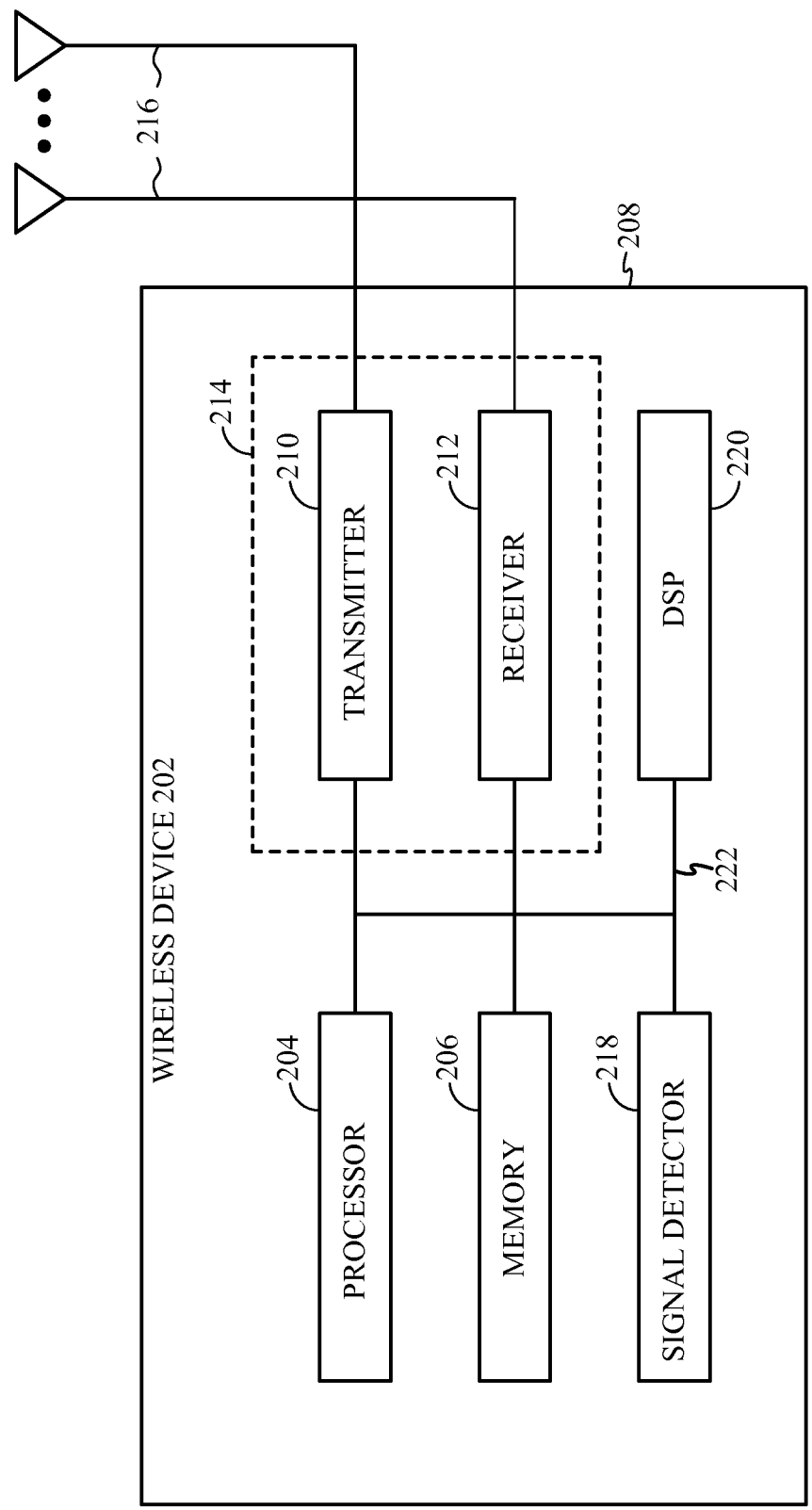
FIG. 2 illustrates a block diagram of an example wireless device in accordance with certain embodiments of the present disclosure.

FIG. 2 illustrates various components that may be utilized in a wireless device 202 that may be employed within the communication system 100. The wireless device 202 is an example of a device that may be configured to implement the various methods described herein. The wireless device 202 may be the access point 104 or the access terminal (user equipment) 102.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. A plurality of transmit antennas 216 may be attached to the housing 208 and electrically coupled to the transceiver 214. The wireless device 202 may also include (not shown) multiple transmitters, multiple receivers, and multiple transceivers.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals.

The various components of the wireless device 202 may be coupled together by a bus system 222, which may include a power bus, a control signal bus, and a status signal bus in addition to a data bus.

Exemplary Multi-Mode Coexistence Modem

Certain embodiments of the present disclosure may allow two or more modem functions to be implemented in a single multi-mode modem of an access terminal, such as the access terminal 102 from FIG. 1. For example, one of the aforementioned WAN technologies (i.e., GSM, CDMA, WCDMA, UMTS, LTE or WiMAX technology) may operate simultaneously and independently with BT/WLAN, FM or GPS technology on the same multi-mode modem. A first system (e.g., a system based on the WCDMA technology) may be in the transmission mode, while a second system (e.g., a system based on the GPS technology) may be in the reception mode. Interference may occur within the multi-mode modem of the access terminal due to emissions of transmitting signals into receiving frequency band(s) causing desensitization of the receiving signal. Therefore, interference cancellation may need to be employed within the multi-mode modem.

Figure 3:
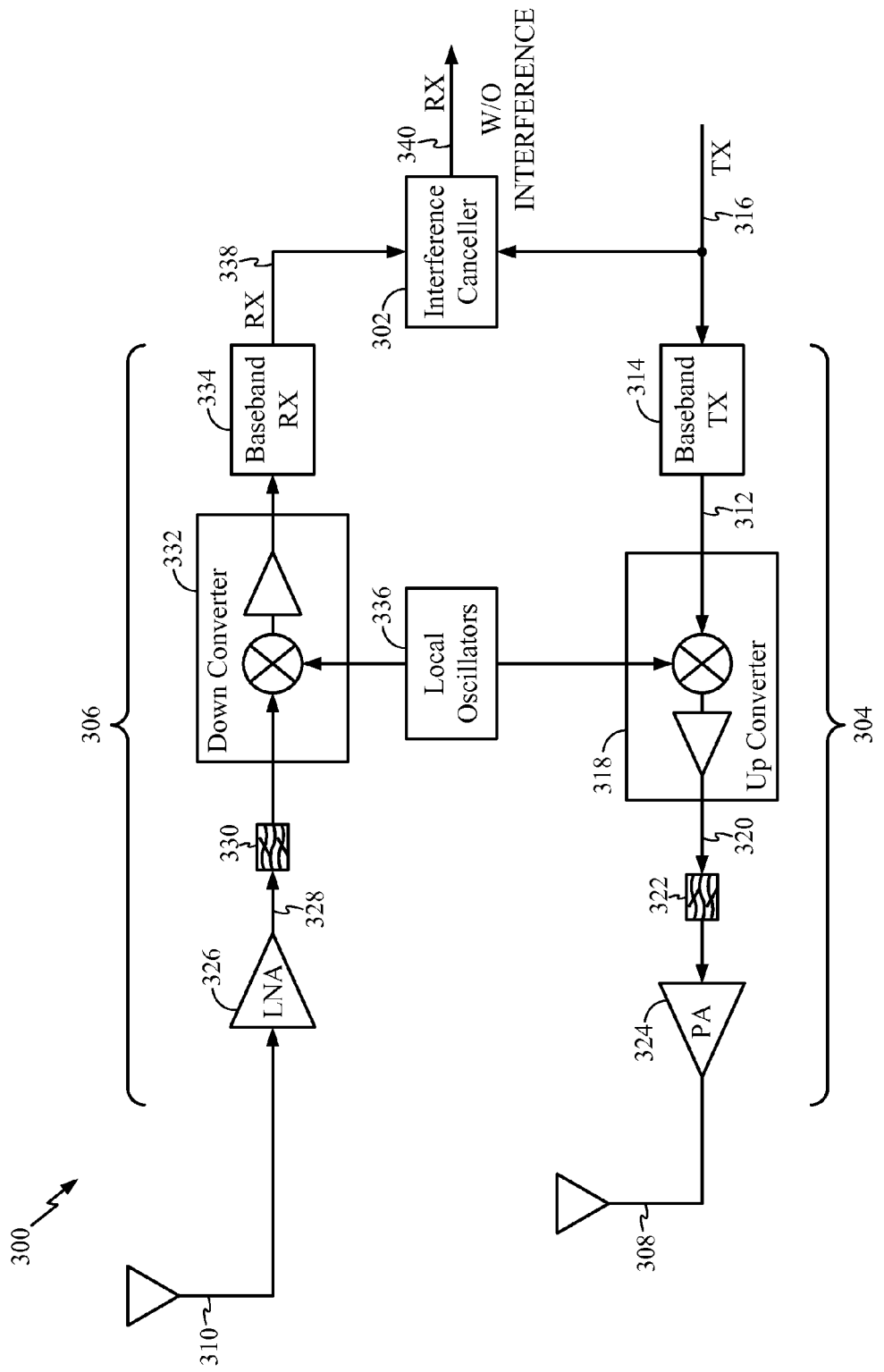
FIG. 3 illustrates a dual-mode modem for transmission/reception with an integrated interference canceller in accordance with certain embodiments of the present disclosure.

FIG. 3 illustrates a dual-mode modem 300 with an integrated interference canceller 302 in accordance with certain embodiments of the present disclosure. The modem 300 may be implemented, for example, within the access terminal 102 from FIG. 1, and it may represent dual-mode unit supporting simultaneous (i.e., duplex) transmission/reception of wireless signals belonging to two different radio technologies.

The modem 300 may comprise a transmitter (TX) chain 304 and a receiver (RX) chain 306, both coupled to their respective antennas 308 and 310. In the TX chain 304, a baseband signal 312 generated by a baseband TX circuit 314 from an original TX signal 316 may be converted to a suitable radio frequency (RF) by an up-converter 318. A resultant RF signal 320 may be filtered by a band-pass filter 322, amplified by a power amplifier 324 and then passed to the antenna 308 for over-the-air transmission.

A signal received by the antenna 310 in a designated RX band may pass through a low-noise amplifier (LNA) 326. An amplified signal 328 may be filtered by a band-pass filter 330, down-converted to baseband by a down-converter 332, and then conveyed for processing to a baseband RX circuit 334. Both the up-converter 318 and down-converter 332 may be driven by local oscillator (LO) circuits 336. Alternatively, each of the converters 318 and 332 may comprise its own separate LO circuits.

It can be observed from FIG. 3 that a frequency band of the TX signal 316 may be translated by one or more spur frequency components originated from the LO circuits 336. This may cause interference within a baseband RX signal 338 and its significant desensitization. As illustrated in FIG. 3, the interference canceller 302 may be applied on the contaminated RX baseband signal 338 to eliminate the interference, while the knowledge of TX signal 336 may be utilized. The applied interference cancellation may result into generating a desired RX signal 340 without interference.

Different methods are proposed in the present disclosure for interference cancellation in multi-mode co-existence modems, such as the modem 300 illustrated in FIG. 3. In one embodiment of the present disclosure, a narrowband interference cancellation may be applied. In another embodiment of the present disclosure, a direct broadband interference cancellation may be applied. The term "narrowband" indicates that a frequency band of a corresponding signal may be narrower (e.g., after certain frequency transformations) relative to the signal's original frequency band. On the other hand, the term "broadband" indicates that a frequency band of a corresponding signal may be broader (e.g., after certain frequency transformations) relative to the signal's original frequency band. Therefore, a frequency band of the broadband signal may be broader than a frequency band of the narrowband signal, if both of these signals are obtained from the same original signal.

In one embodiment of the present disclosure, the RX signal 338 with the interference caused by the TX chain 304 of Mode 1 transmission may be translated into a narrowband tone corresponding to a spur frequency of the LO circuitry 334. The Mode 1 TX signal 336 may be known, and this information may be exploited for the aforementioned frequency translation. The narrowband interference may be then eliminated by applying a notch filter on the translated RX signal or, alternatively, by applying some adaptive filtering technique. In addition, a process of reversing the aforementioned frequency translation may need to be performed in order to obtain the Mode 2 RX signal 340 without interference.

In another embodiment of the present disclosure, the aggressor Mode 1 TX signal 336 may be first translated by one or more spur frequencies of the LO circuitry 334. Then, the translated TX signal may be input into a complex passband adaptive filter to generate a replica of broadband interference (i.e., of an interference within the RX signal 338). The replicated broadband interference may be directly subtracted from the RX Mode 2 signal 338 to obtain the RX signal 340 without interference. Taps of the adaptive filter may be adjusted based on the subtraction output.

Instead of the aforementioned pass-band filter, a baseband complex adaptive filter may be directly applied on the Mode 1 TX signal 336. In this case, an output of the baseband adaptive filter may be operated on by a spur frequency translator before subtracting it from the RX Mode 2 signal 338. The frequency translation in this case may correspond to a rotation of the filtered TX signal, and the subtraction output may need to be de-rotated by the spur frequency before adjusting the filter taps.

Figure 4:
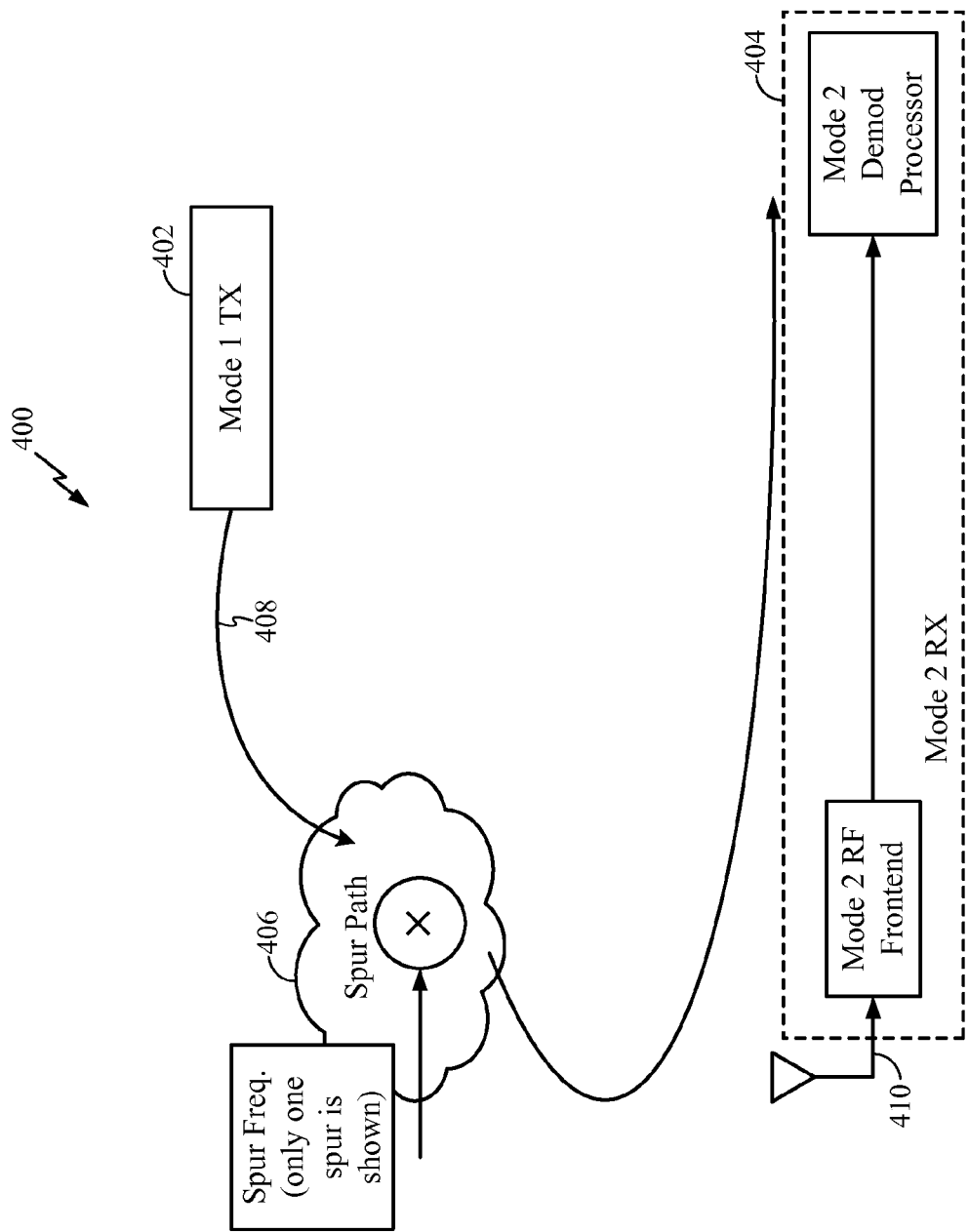
FIG. 4 illustrates an example of interference scenario in a multi-mode modem in accordance with certain embodiments of the present disclosure.

FIG. 4 illustrates an example of interference scenario 400 in a multi-mode modem, such as the modem 300 from FIG. 3 in accordance with certain embodiments of the present disclosure. Interference generated by a transmitter (TX) 402 of Mode 1 may appear at a receiver (RX) 404 of Mode 2 after frequency translation by one or more spur frequency components (paths) 406. The spur frequency components 406 may be present at an output of LO circuits that may be utilized to either up-convert a Mode 1 TX signal 408 or to down-convert a Mode 2 RX signal 410.

The aforementioned narrowband and broadband interference cancellation techniques applied in multi-mode modes will be described in greater detail below. The interference scenario 400 illustrated in FIG. 4 can be considered.

Exemplary Narrowband Interference Cancellation in Multi-Mode Modem

Figure 5:
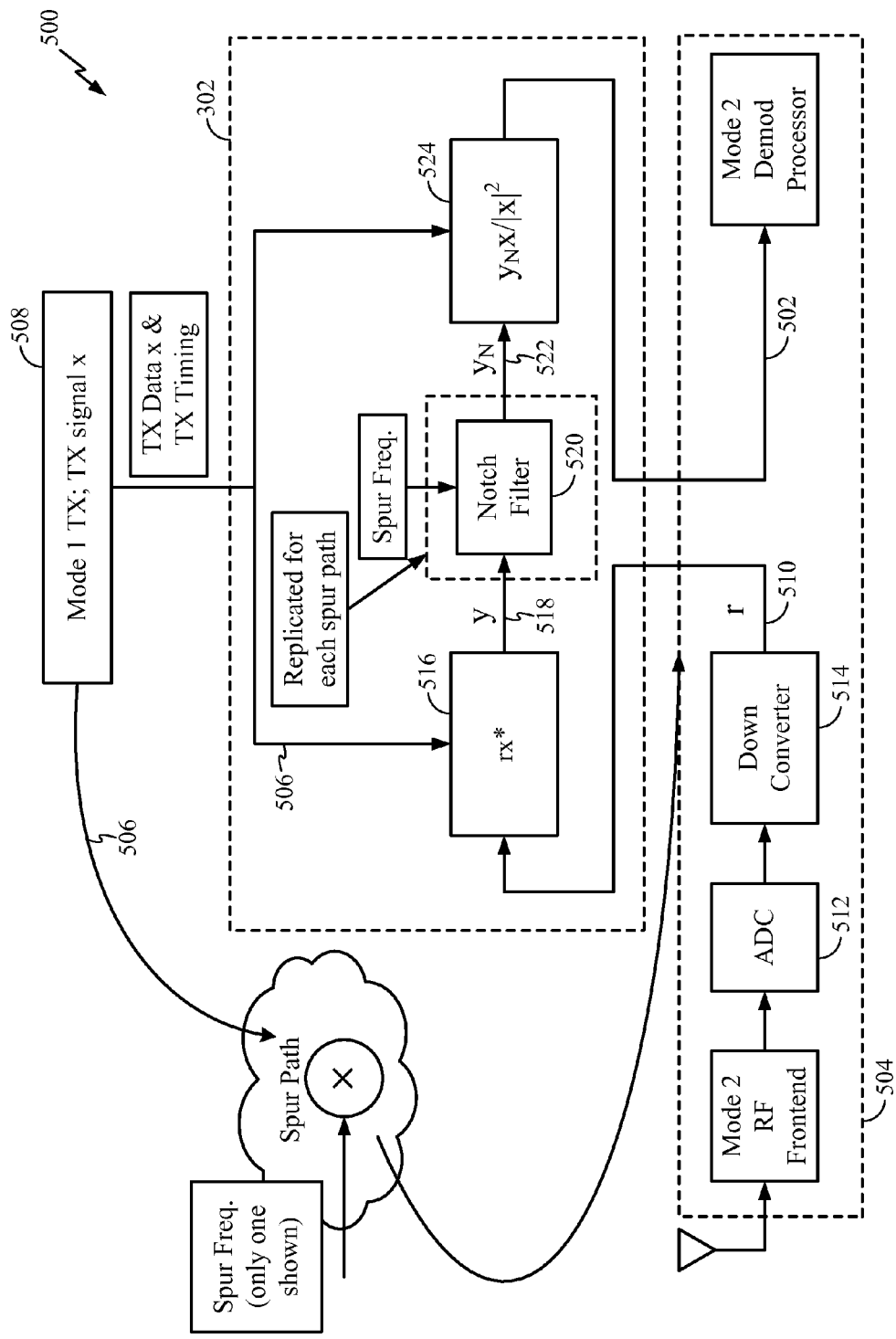
FIG. 5 illustrates an example of narrowband interference canceller in a multi-mode modem in accordance with certain embodiments of the present disclosure.

Certain embodiments of the present disclosure support a narrowband interference cancellation in multi-mode wireless modems. FIG. 5 illustrates an example implementation 500 of the narrowband interference canceller 302 from FIG. 3 within a multi-mode modem in accordance with certain embodiments of the present disclosure.

Let d(t) denotes a desired complex baseband signal without interference (i.e., a signal 502 in FIG. 5) obtained at a RX 504 of Mode 2 modem after interference cancellation, and let x(t) denotes a complex baseband signal 506 transmitted by a TX of aggressor modem (i.e., a TX 508 of Mode 1 modem). Then, a combined received complex baseband signal 510 at the RX 504 of Mode 2 modem (following analog-to-digital conversion 512 and down-conversion 514) may be written as:

$$r(t)=d(t)+G\cdot x(t)\cdot e^{j(\omega_{spur}t+\phi)}, \quad (1)$$

where the expression $G\cdot x(t)\cdot e^{j(\omega_{spur}t+\phi)}$ denotes interference from the TX 508 of Mode 1 modem at the RX 504 of Mode 2 modem, G is an unknown gain term, $\omega_{spur}$ is a known (or estimated) spur frequency, and $\phi$ is an unknown phase offset.

The interference defined in equation (1) may be eliminated as follows. First, the received signal 510 given by equation (1) may be multiplied in unit 516 with a conjugate version of a signal 506 transmitted from the TX 508 of Mode 1 modem. This may yield a signal 518 defined as:

$$y(t)=r(t)\cdot x^*(t)=d(t)\cdot x^*(t)+G\cdot |x(t)|^2 \cdot e^{j(\omega_{spur}t+\phi)}. \quad (2)$$

The power of transmitted baseband signal $|x(t)|^2$ may be either constant (as for the QPSK modulation) or slowly varying. Therefore, the modified interference term $G\cdot |x(t)|^2 \cdot e^{j(\omega_{spur}t+\phi)}$ from equation (2) may represent a narrowband (tone) signal. In one embodiment of the present disclosure, this interference term may be eliminated from the signal 518 by applying a notch filter 520, as illustrated in FIG. 5. The notch filter 520 may be replicated for each anticipated spur frequency component. In another embodiment of the present disclosure, an adaptive least mean square (LMS) filter (e.g., one-tap or two-tap filter) may be used instead of the notch filter 520.

After cancelling the narrowband interference, the desired Mode 2 modem RX signal 502 may be recovered by a unit 524 as:

$$d(t)=\frac{\{y(t)\}_{NotchFiltered}\cdot x(t)}{|x(t)|^2}, \quad (3)$$

where $\{y(t)\}_{NotchFiltered}$ represents a signal 522 at the output of the notch filter 520. In the case of QPSK modulation, equation (3) may be simplified as:

$$d(t)=\{y(t)\}_{NotchFiltered}\cdot x(t). \quad (4)$$

If the power of transmitted baseband signal $|x(t)|^2$ is not slowly varying, then operations performed by the units 516 and 524 may be modified as follows. First, the received signal 510 given by equation (1) may be multiplied in the unit 516 with the conjugate version of the signal 506 and then divided by its power $|x(t)|^2$. This may be equivalent to dividing the received signal 510 by the complex baseband signal 506. The modified received signal 518 may be now given as:

$$y(t)=\frac{r(t)\cdot x^*(t)}{|x(t)|^2}=\frac{d(t)}{x(t)}+G\cdot e^{j(\omega_{spur}t+\phi)}, \quad (5)$$

where the modified interference term $G\cdot e^{j(\omega_{spur}t+\phi)}$ represents a narrowband (tone) signal.

In one embodiment of the present disclosure, the modified interference term from equation (5) may be eliminated by applying the notch filter 520, as illustrated in FIG. 5. The notch filter 520 may be replicated for each anticipated spur frequency component. In another embodiment of the present disclosure, an adaptive LMS filter (e.g., one-tap or two-tap filter) may be utilized instead of the notch filter 520. After cancelling the narrowband interference, the desired Mode 2 modem RX signal 502 may be recovered by the unit 524 as:

$$d(t)=\{y(t)\}_{NotchFiltered}\cdot x(t), \quad (6)$$

where $\{y(t)\}_{NotchFiltered}$ represents the signal 522 at the output of the notch filter 520.

For certain embodiments, due to the presence of sharp filters in a spur path, it is conceivable that the interference may contain an inter-sample interference (ISI) component in addition to a direct interference component. In such cases, the ISI-contaminated interference term may be written as:

$$G\cdot [x(t)+\alpha x(t-1)]\cdot e^{j(\omega_{spur}t+\phi)}, \quad (7)$$

where, for illustration purposes only, the ISI may span one sampling period, and a coefficient α denotes a fractional magnitude of the ISI component relative to the direct interference component (i.e., the direct component of transmission signal). In general, the ISI may span more than one sampling period, and it may comprise multiple ISI components.

The proposed interference cancellation scheme may be extended to address the case when interference may be contaminated with one or more ISI components, as defined by equation (7) for one ISI component. In one embodiment of the present disclosure, one or more coefficients (fractional magnitudes) associated with the ISI components may be estimated by equalizing the received signal contaminated with the interference. In equations (2) and (4) that delineate the transformation of the broadband interference into the narrowband interference, the direct transmitted baseband signal $x(t)$ may be replaced by the ISI-contaminated baseband signal $z(t)=x(t)+\alpha x(t-1)$. The modified transmission signal $z(t)$ may therefore represent the effective transmitted baseband signal used for eliminating the broadband interference. It should be also understood that the conjugate and power terms of the direct transmitted signal $x(t)$ appearing in equations (2) and (4) may be replaced by the corresponding terms of the signal $z(t)$. The same replacements may be applied in equations (3), (4) and (6) for recovery of the desired Mode 2 modem RX signal 502.

In another embodiment of the present disclosure, the values of ISI coefficients may not need to be estimated. Elimination of the ISI-contaminated broadband interference may now comprise a cascade of interference cancellers, wherein a required number of cascade stages may depend on the ISI span. Considering one ISI component for the illustration purpose, the interference due to the direct transmission component $x(t)$ may be cancelled in the first cascade stage as before by using $x(t)$ as the transmitted baseband signal. In the second cancelling stage, the interference caused by the ISI component $x(t-1)$ may be cancelled using $x(t-1)$ as the new transmitted baseband signal. It should be noted that the value of coefficient $\alpha$ may not need to be known since this value may be absorbed into the general gain term G defined in equation (1). Thus, the cascade of two interference cancellers (or, in general, as many cancellers as the number of ISI components plus one) may be required. The advantage of this approach is that the estimation of relative strengths of the ISI components may not be required.

Figure 6:
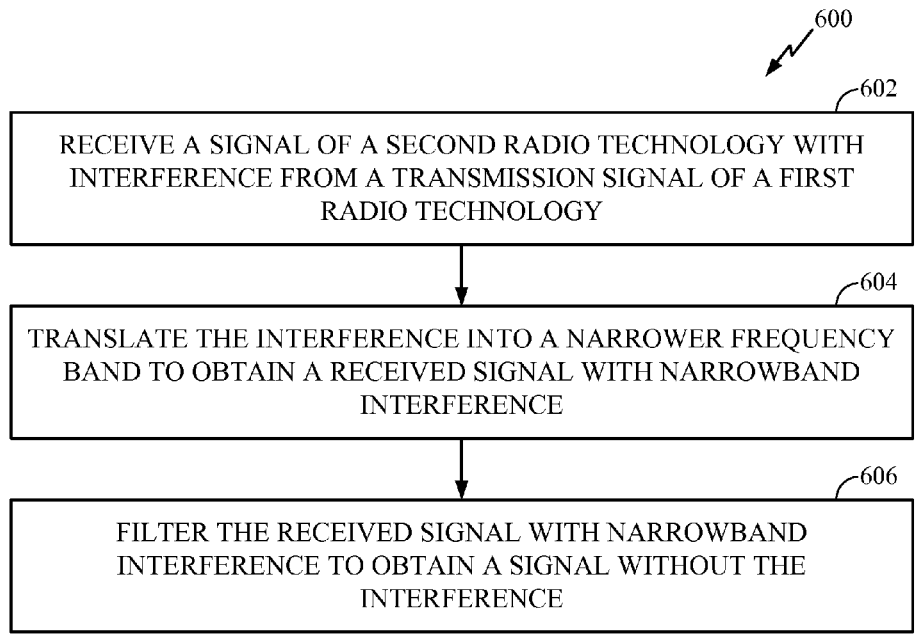
FIG. 6 illustrates example operations for narrowband interference cancellation in a multi-mode modem in accordance with certain embodiments of the present disclosure.

FIG. 6 illustrates example operations 600 for the aforementioned narrowband interference cancellation in a multi-mode modem in accordance with certain embodiments of the present disclosure. At 602, a signal of one radio technology may be received comprising interference from a transmission signal of another radio technology. At 604, the interference may be translated into a narrower frequency band to obtain a received signal with narrowband interference. At 606, the received signal with narrowband interference may be filtered to obtain a signal without the interference.

Figure 7:
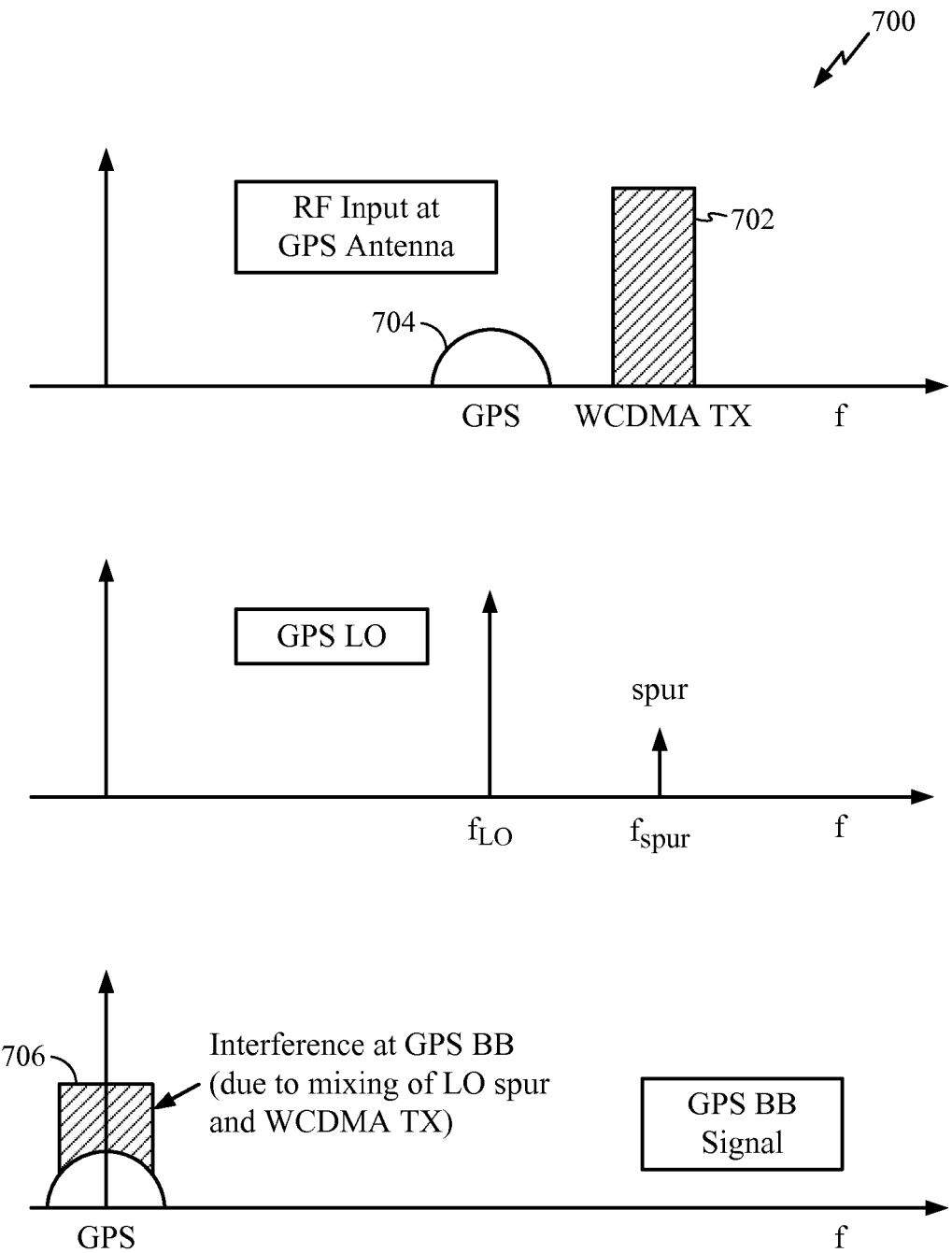
FIG. 7 illustrates example interference from mixing of a Wideband Code Division Multiple Access (WCDMA) transmission signal and a Global Positioning System (GPS) local oscillator (LO) spur frequency component in accordance with certain embodiments of the present disclosure.

The proposed narrowband canceller illustrated in FIG. 5 may be applied within, for example, a dual-mode WCDMA/GPS modem. FIG. 7 illustrates example graphs 700 representing generation of interference from mixing of a WCDMA TX signal 702 and a GPS LO spur frequency component 704 in accordance with certain embodiments of the present disclosure. The mixing of interfering Wireless Wide Area Network (WWAN) TX signal (e.g., the WCDMA TX signal 702) and the GPS LO spur frequency components 704 at the GPS RF front-end may cause interference in a GPS baseband (BB) signal 706 resulting in significant desensitization at the GPS receiver.

Figure 8:
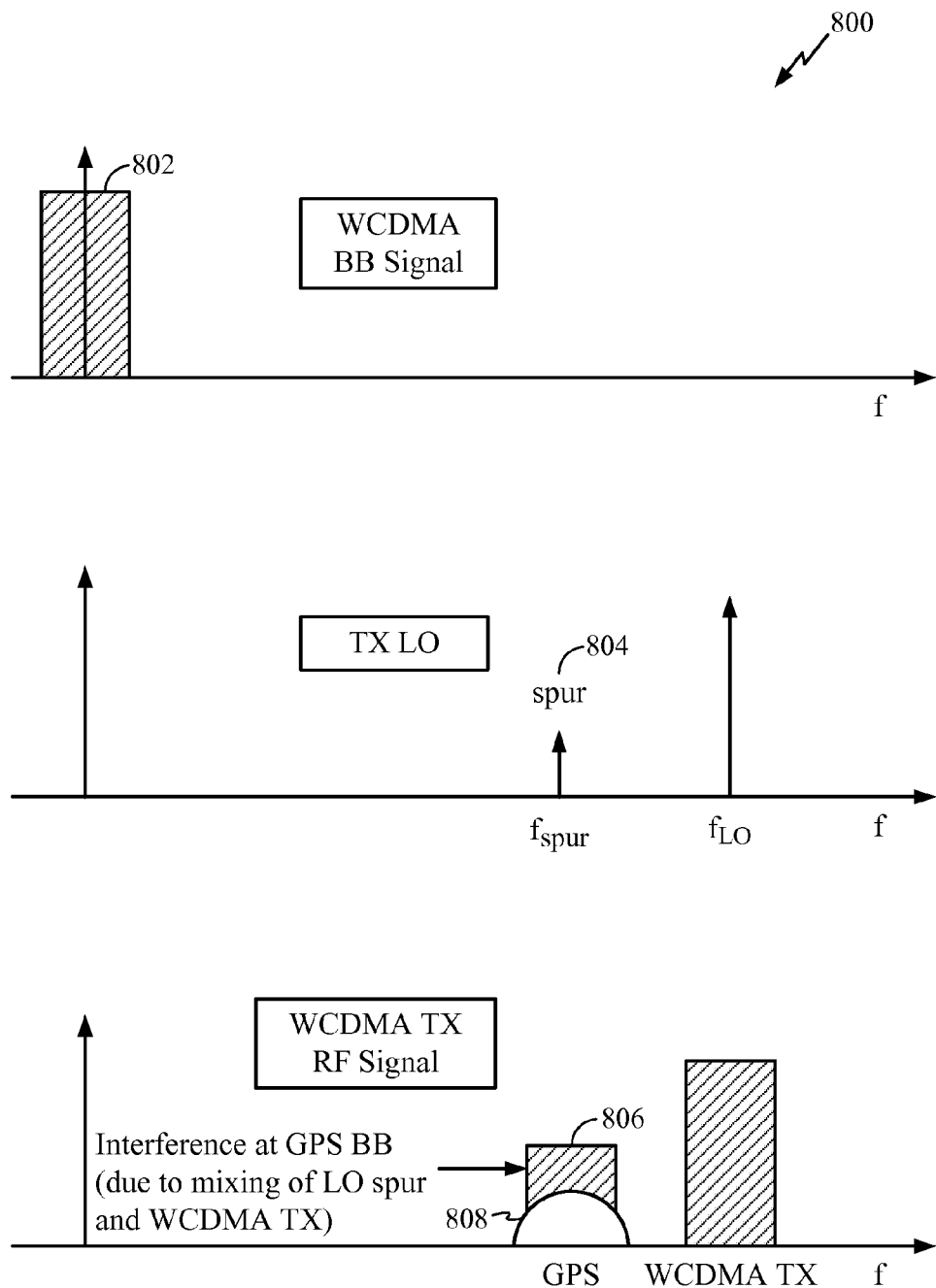
FIG. 8 illustrates example interference from mixing of a WCDMA transmission signal and a WCDMA LO spur frequency component in accordance with certain embodiments of the present disclosure.

FIG. 8 illustrates example graphs 800 representing generation of interference from mixing of a WCDMA BB transmission signal 802 and a WCDMA LO spur frequency component 804 in accordance with certain embodiments of the present disclosure. At a WWAN up-converter (e.g., a WCDMA up-converter) of a WWAN TX modem, the WWAN LO spur frequency components 804 may cause interference 806 directly into a GPS pass-band signal 808, as illustrated in FIG. 8. This interference may be automatically picked up by the GPS receiver, which may cause desensitization at the receiver.

Figure 9:
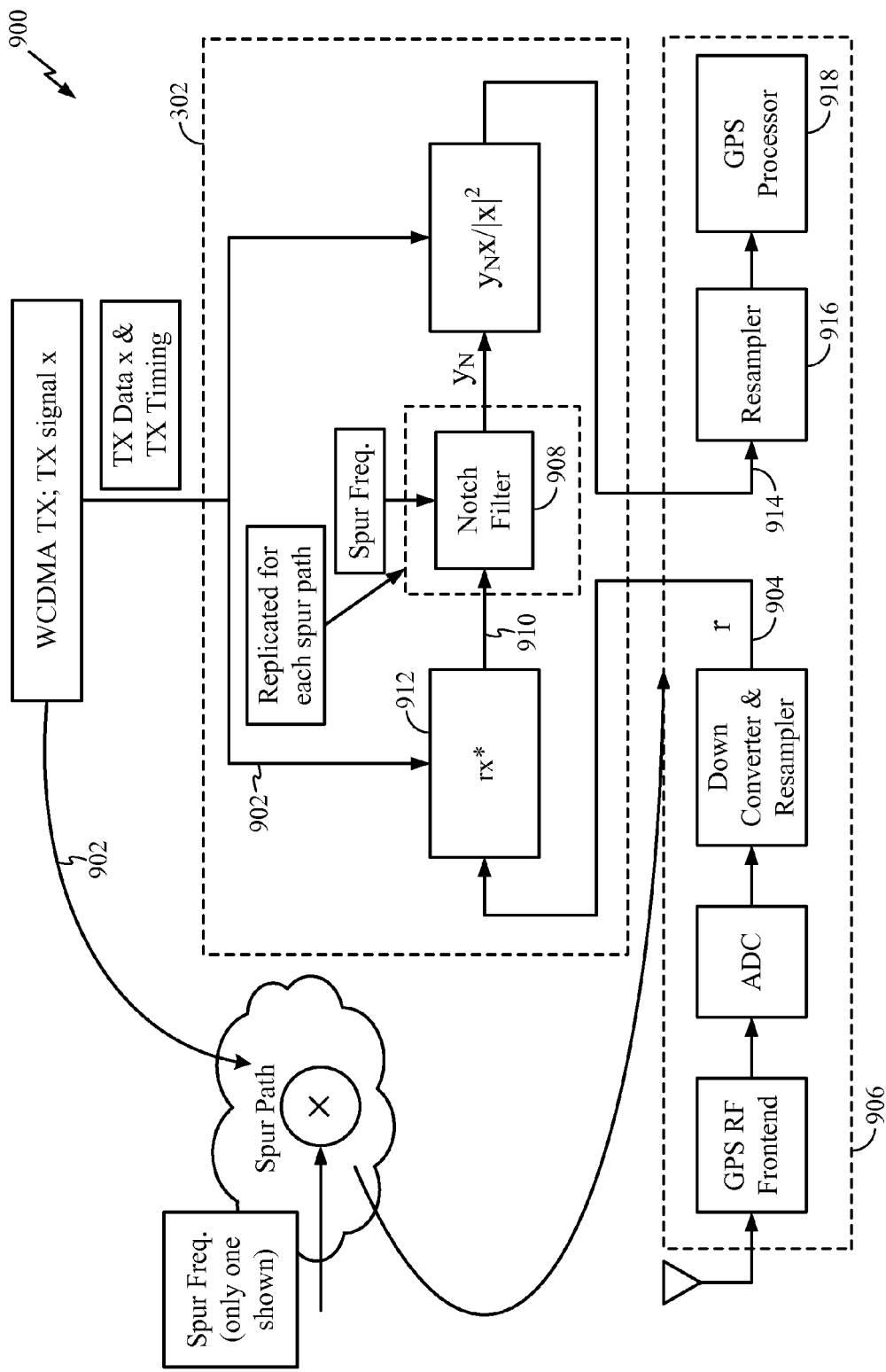
FIG. 9 illustrates an example of narrowband interference canceller in a WCDMA/GPS modem in accordance with certain embodiments of the present disclosure.

FIG. 9 illustrates an example implementation 900 of the narrowband interference canceller 302 from FIG. 3 within a WCDMA/GPS modem combination in accordance with certain embodiments of the present disclosure. A higher power WCDMA TX signal 902 may cause interference into a GPS RX signal 904, which may result in poor performance of a GPS receiver 906. Data and timing associated with the TX WCDMA baseband signal 902 may be fully known. Then, the interference may be cancelled from the GPS RX signal 904 by applying a notch filter 908, or, alternatively, an adaptive LMS filter, as described earlier. The spur frequencies may be also known, and one notch filter (such as the notch filter 908) may be placed at each of the spur frequency components.

If the spur frequencies are not known beforehand, these frequency components may be estimated by applying a fast Fourier transform (FFT) of a signal 910 at an output of a processing unit 912. In addition, a re-sampler 916 may be required within the GPS receiver 906 for translation of a WCDMA chip-rate signal 914 (i.e., a GPS RX signal without interference) into a rate commensurate with a GPS processor 918.

Figure 10:
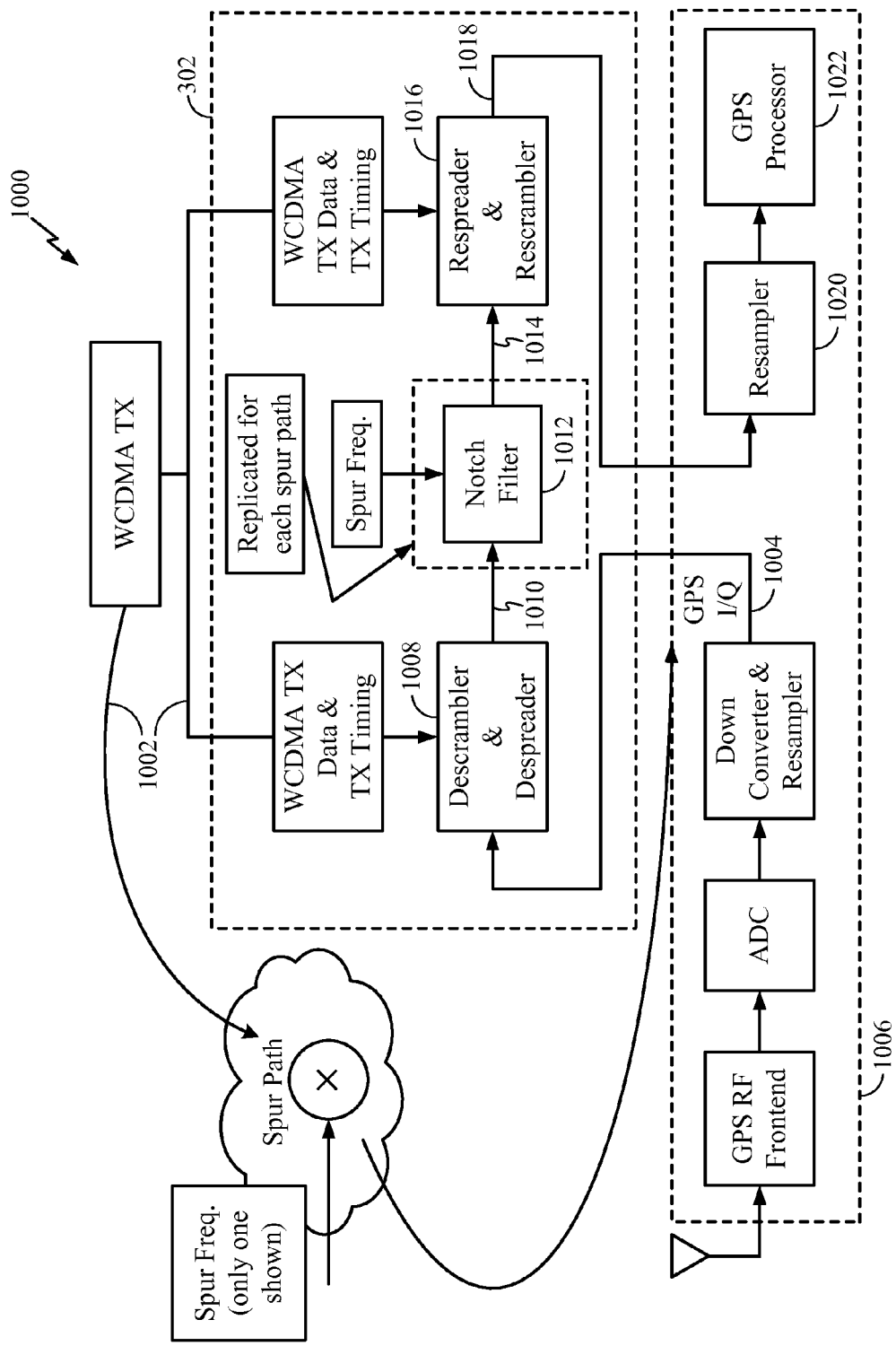
FIG. 10 illustrates another example of narrowband interference canceller in a WCDMA/GPS modem in accordance with certain embodiments of the present disclosure.

FIG. 10 illustrates an example implementation 1000 of the narrowband interference canceller 302 from FIG. 3 within a WCDMA/GPS modem combination in accordance with certain embodiments of the present disclosure. A higher power TX WCDMA signal 1002 may cause interference into a GPS RX signal 1004, which may result in poor performance of a GPS receiver 1006. The broadband interference within the GPS RX signal 1004 may be translated into narrowband tones by employing WCDMA descrambler/de-spreader codes at a descrambler/de-spreader 1008.

The narrowband interference tones present in a signal 1010 may be eliminated by applying a notch filter 1012 for each spur path. Alternatively, an adaptive LMS filter (e.g., one-tap or two-tap filter) may replace each notch filter. A filtered signal 1014 may be re-spread/re-scrambled by a re-spreader/re-scrambler unit 1016. A WCDMA chip-rate signal 1018 (i.e., a GPS RX signal without interference) may be re-sampled by a re-sampler unit 1020 of the GPS receiver 1006 for translation of the signal 1018 into a rate commensurate with a GPS processor 1022.

The proposed narrowband active cancellation of the WCDMA (and potentially other) interference at the GPS receiver is beneficial for performance of this receiver. The proposed solution may also relax LO spur specifications, and it may replace the costly solution based on an external Low-Noise Amplifier (LNA) integrated with a Surface Acoustic Wave (SAW) band-pass filter. In addition, significant power and real estate savings may be achieved due to elimination of the GPS SAW and GPS LAN devices. In the same time, power and real estate required for the proposed narrowband cancellation circuit may be insignificant.

Exemplary Broadband Interference Cancellation in Multi-Mode Modem

Figure 11:
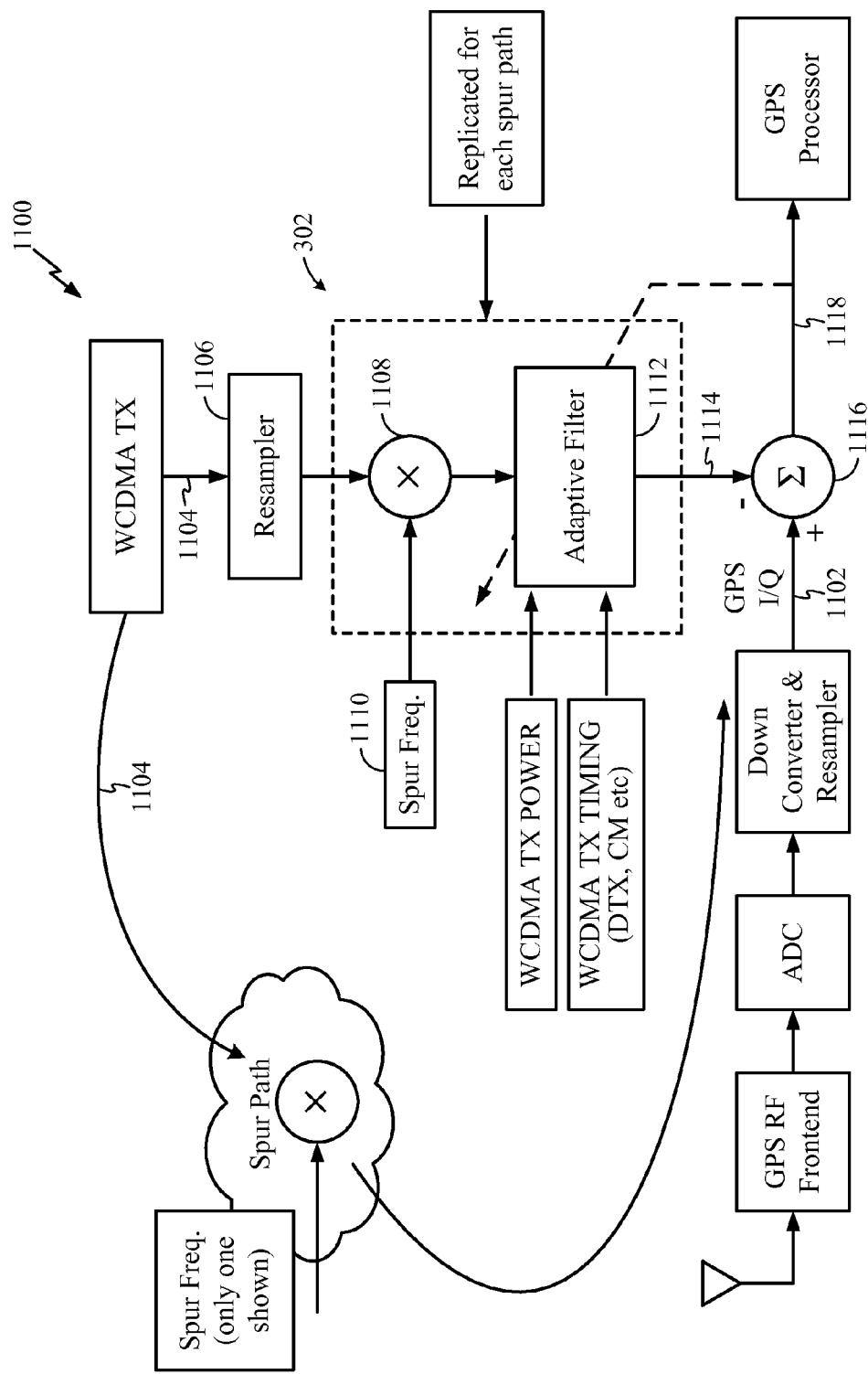
FIG. 11 illustrates an example of broadband interference canceller in a multi-mode modem in accordance with certain embodiments of the present disclosure.

Certain embodiments of the present disclosure employ a broadband approach for cancelling interference in multi-mode modems. FIG. 11 illustrates an example implementation of the broadband interference canceller 302 from FIG. 3 within a multi-mode modem (e.g., a WCDMA/GPS modem combination) in accordance with certain embodiments of the present disclosure.

A signal 1102 of a first radio technology (e.g., the GPS technology) with broadband interference originating from a transmission signal 1104 of a second radio technology (e.g., the WCDMA technology) may be received at a multi-mode modem 1100. The complex baseband transmission signal 1104 (i.e., the aggressor signal) may be re-sampled by a re-sampler 1106 and then translated using a mixer 1108 by a spur frequency component 1110. Then, a complex pass-band adaptive filter 1112 may be applied to generate a replica 1114 of the broadband interference within the received signal 1102. The replicated interference signal 1114 may be then directly subtracted from the received signal 1102 that represents a sum of a received signal without interference and the broadband interference. One or more taps of the complex pass-band filter 1112 may be adjusted based on an output 1118 of a subtractor 1116. The spur frequency translator 1108 and the adaptive pass-band filter 1112 may be replicated for each of the anticipated spur paths.

Figure 12:
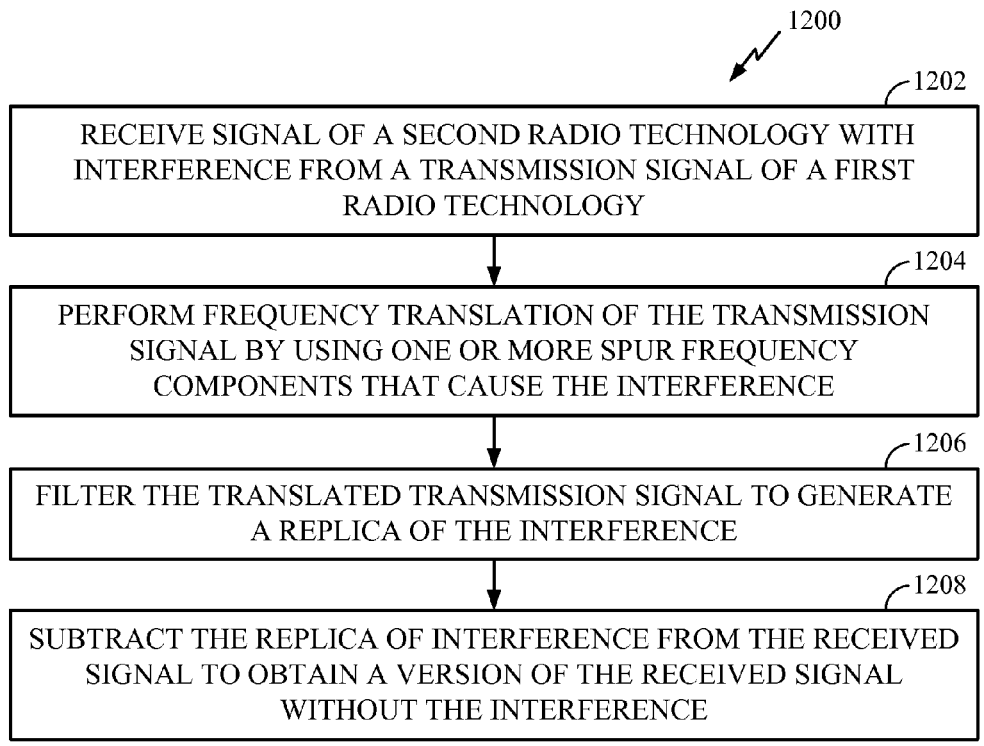
FIG. 12 illustrates example operations for broadband interference cancellation in a multi-mode modem in accordance with certain embodiments of the present disclosure.

FIG. 12 illustrates example operations 1200 for the broadband interference cancellation in a multi-mode modem based on the proposed pass-band adaptive filtering in accordance with certain embodiments of the present disclosure. At 1202, a signal of one radio technology may be received comprising interference from a transmission signal of another radio technology. At 1204, frequency translation of the transmission signal may be performed by using one or more spur frequency components that cause the interference. At 1206, the translated transmission signal may be filtered to generate a replica of the interference. At 1208, the replica of interference may be subtracted from the received signal to obtain a version of the received signal without the interference.

For certain embodiments of the present disclosure, a complex adaptive baseband filter may be employed instead of the pass-band filtering scheme illustrated in FIG. 11. The complex adaptive baseband filter may operate directly on the WCDMA transmission signal 1104, and an output of this adaptive filter may need to be operated on by a spur frequency translator. The frequency translation may correspond to a rotation before subtracting the translated filtered signal from the GPS received signal 1102. Therefore, the subtraction output may need to be de-rotated by the spur frequency component, and one or more taps of the complex adaptive baseband filter may be adjusted based on the de-rotated received signal.

Figure 13:
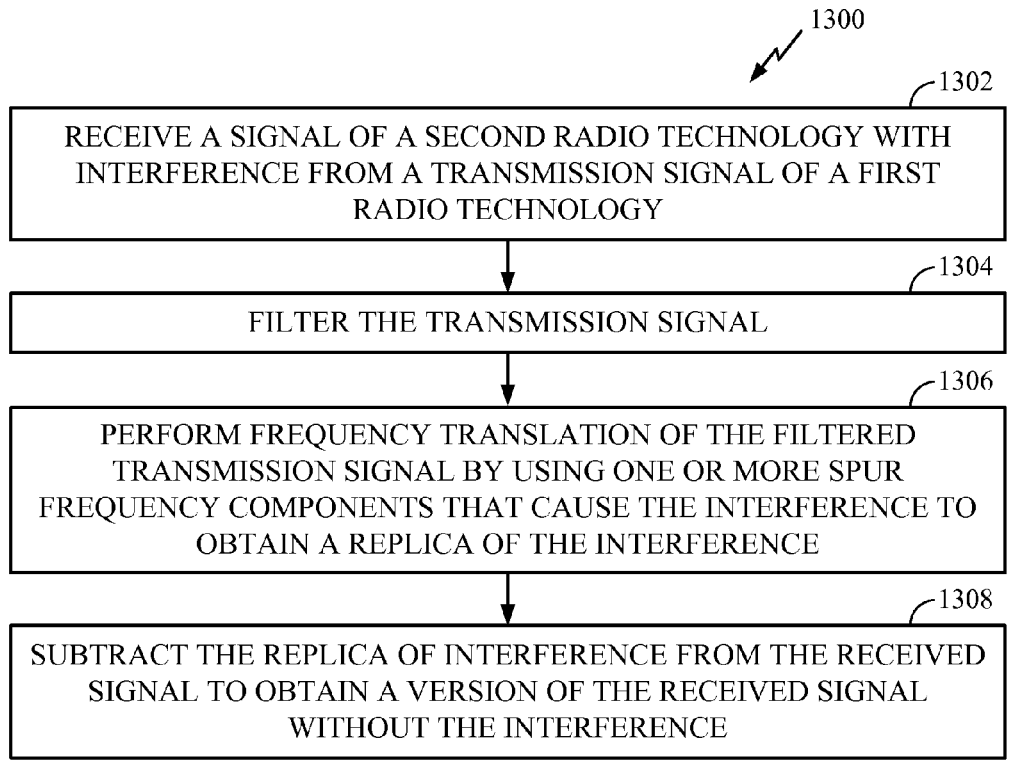
FIG. 13 illustrates other example operations for broadband interference cancellation in a multi-mode modem in accordance with certain embodiments of the present disclosure.

FIG. 13 illustrates example operations 1300 for the broadband interference cancellation in multi-mode modems based on the baseband adaptive filtering in accordance with certain embodiments of the present disclosure. At 1302, the signal 1102 of one radio technology (e.g., the GPS technology) may be received comprising interference from the transmission signal 1104 of another radio technology (e.g., the WCDMA technology). At 1304, a complex adaptive baseband filter may be directly applied on the WCDMA transmission signal 1104. At 1306, an output signal from the adaptive baseband filter may be translated using one or more spur frequency components that cause the interference to obtain a replica of the interference. At 1308, the replica of interference may be directly subtracted from the received signal to obtain a version of the received signal without the interference.

Figure 6A:
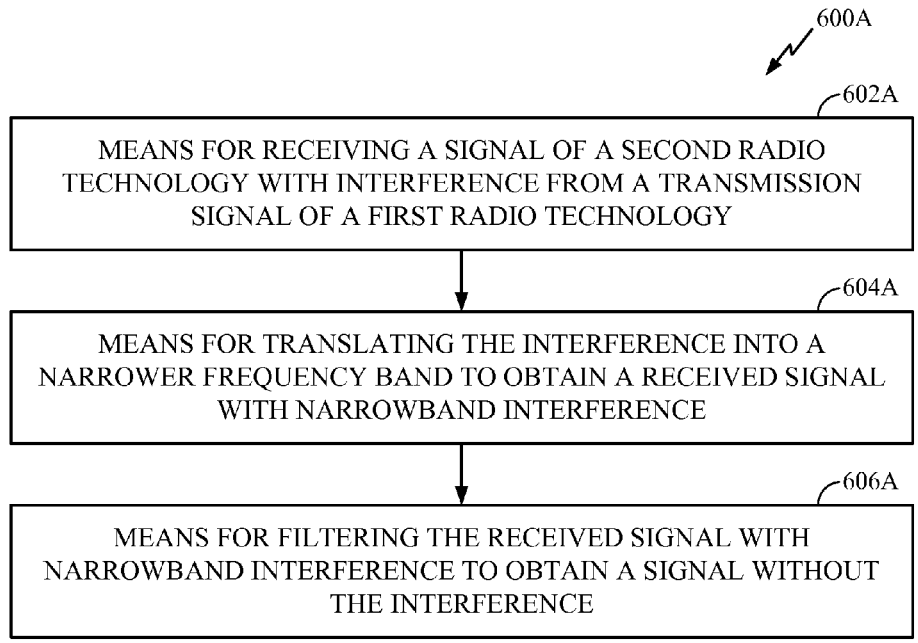
FIG. 6A illustrates example components capable of performing the operations illustrated in FIG. 6.
Figure 12A:
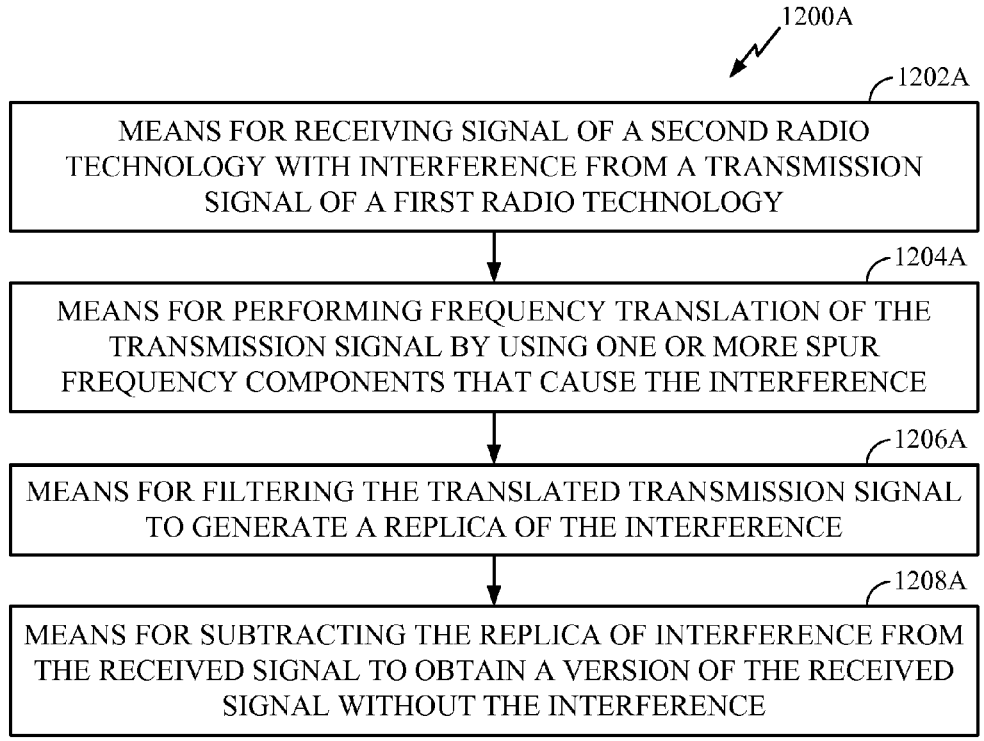
FIG. 12A illustrates example components capable of performing the operations illustrated in FIG. 12.
Figure 13A:
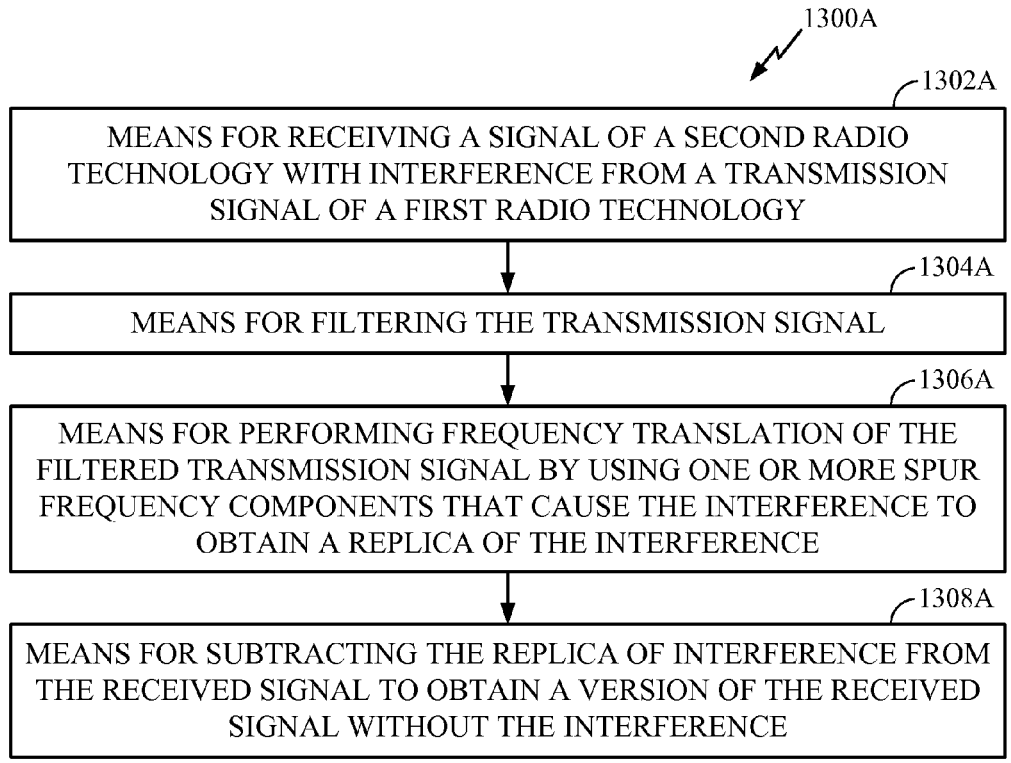
FIG. 13A illustrates example components capable of performing the operations illustrated in FIG. 13.

The various operations of methods described above may be performed by various hardware and/or software component(s) and/or module(s) corresponding to means-plus-function blocks illustrated in the Figures. For example, blocks 602-608 illustrated in FIG. 6 correspond to means-plus-function blocks 602A-608A illustrated in FIG. 6A. Similarly, blocks 1202-1208 illustrated in FIG. 12 correspond to means-plus-function blocks 1202A-1208A illustrated in FIG. 12A. Similarly, blocks 1302-1308 illustrated in FIG. 13 correspond to means-plus-function blocks 1302A-1308A illustrated in FIG. 13A. More generally, where there are methods illustrated in Figures having corresponding counterpart means-plus-function Figures, the operation blocks correspond to means-plus-function blocks with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk and Blu-ray® disc where disks usually reproduce data magnetically, while discs reproduce data optically with lasers.

Thus, certain embodiments may comprise a computer program product for performing the operations presented herein. For example, such a computer program product may comprise a computer readable medium having instructions stored (and/or encoded) thereon, the instructions being executable by one or more processors to perform the operations described herein. For certain embodiments, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio and microwave, then the coaxial cable, fiber optic cable, twisted pair, DSL, or wireless technologies such as infrared, radio and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to embodiments of the present disclosure, other and further embodiments of the disclosure may be devised without departing from the basic scope thereof, and the scope thereof is determined by the claims that follow.

What is claimed is:

1. A method for wireless communications, comprising:
  receiving a signal of a second radio technology with interference from a transmission signal of a first radio technology;
  translating the interference into a narrower frequency band to obtain a received signal with narrowband interference; and
  filtering the received signal with narrowband interference to obtain a signal without the interference.

2. The method of claim 1, further comprising:
  multiplying the signal without interference with the transmission signal and dividing by a power of the transmission signal to obtain a recovered version of the received signal without the interference, if the power of transmission signal is slowly varying; and
  multiplying the signal without interference with the transmission signal to obtain the recovered version of received signal without the interference, if the power of transmission signal is not slowly varying.

3. The method of claim 1, wherein the first radio technology comprises Wireless Wide Area Network (WWAN) technology and the second radio technology comprises Global Positioning System (GPS) technology.

4. The method of claim 1, wherein translating the interference into the narrower frequency band comprises:
  multiplying the received signal with interference with a conjugate version of the transmission signal, if a power of the transmission signal is slowly varying; and
  multiplying the received signal with interference with the conjugate version of transmission signal and dividing by the power of transmission signal, if the power of transmission signal is not slowly varying.

5. The method of claim 1, wherein filtering comprises:
  applying, for each spur frequency component of one or more spur frequency components that cause the interference, a notch filter on the received signal with narrowband interference.

6. The method of claim 5, wherein the one or more spur frequency components are estimated by performing a fast Fourier transform (FFT) of the received signal with narrowband interference.

7. The method of claim 1, wherein filtering comprises:
  applying, for each spur frequency component of one or more spur frequency components that cause the interference, an adaptive least mean square (LMS) filter on the received signal with narrowband interference.

8. The method of claim 1, wherein translating the interference into the narrower frequency band comprises:
  descrambling and de-spreading the received signal with interference, and the method further comprising:
  re-spreading and re-scrambling the signal without interference.

9. The method of claim 1, wherein translating the interference into the narrower frequency band comprises:
  equalizing the received signal with interference to estimate one or more coefficients, each of the coefficients representing a fractional magnitude of one inter-sample interference (ISI) component of the transmission signal within the interference relative to a direct component of the transmission signal, if the interference comprises one or more ISI components; and
  multiplying the received signal with interference with a conjugate version of a modified transmission signal and dividing by a power of the modified transmission signal to obtain the received signal with narrowband interference, if the power of modified transmission signal is not slowly varying,
  wherein the modified transmission signal comprises a sum of the direct component of transmission signal and the one or more ISI components with the estimated one or more coefficients.

10. The method of claim 9, further comprising:
  multiplying the signal without interference with the modified transmission signal to obtain a recovered version of the received signal without the interference.

11. The method of claim 1, wherein translating the interference into the narrower frequency band comprises:
  equalizing the received signal with interference to estimate one or more coefficients, each of the coefficients representing a fractional magnitude of one inter-sample interference (ISI) component of the transmission signal within the interference relative to a direct component of the transmission signal, if the interference comprises one or more ISI components; and multiplying the received signal with interference with a conjugate version of a modified transmission signal to obtain the received signal with narrowband interference, if a power of the modified transmission signal is slowly varying, wherein the modified transmission signal comprises a sum of the direct component of transmission signal and the one or more ISI components with the estimated one or more coefficients.

12. The method of claim 11, further comprising:

multiplying the signal without interference with the modified transmission signal and dividing by the power of modified transmission signal to obtain a recovered version of the received signal without the interference.

13. The method of claim 11, further comprising:

receiving another signal of the second radio technology with other interference resulting from another transmission signal of the first radio technology;

processing the other received signal by using a direct component of the other transmission signal to obtain a received signal without interference from the direct component;

processing the received signal without interference from the direct component by using a first inter-sample interference (ISI) component of the other transmission signal to obtain a received signal without interference from the first ISI component; and processing the received signal without interference from the first ISI component by using a second ISI component of the other transmission signal to obtain a received signal without interference from the second ISI component.

14. The method of claim 13, further comprising:

processing the received signal without interference from the second ISI component by using a third ISI component of the other transmission signal to obtain a version of the other received signal without the other interference.

15. An apparatus for wireless communications, comprising:

logic for receiving a signal of a second radio technology with interference from a transmission signal of a first radio technology;

logic for translating the interference into a narrower frequency band to obtain a received signal with narrowband interference; and logic for filtering the received signal with narrowband interference to obtain a signal without the interference.

16. The apparatus of claim 15, further comprising:

logic for multiplying the signal without interference with the transmission signal and dividing by a power of the transmission signal to obtain a recovered version of the received signal without the interference, if the power of transmission signal is slowly varying; and logic for multiplying the signal without interference with the transmission signal to obtain the recovered version of received signal without the interference, if the power of transmission signal is not slowly varying.

17. The apparatus of claim 15, wherein the first radio technology comprises Wireless Wide Area Network (WWAN) technology and the second radio technology comprises Global Positioning System (GPS) technology.

18. The apparatus of claim 15, wherein the logic for translating the interference into the narrower frequency band comprises:

logic for multiplying the received signal with interference with a conjugate version of the transmission signal, if a power of the transmission signal is slowly varying; and logic for multiplying the received signal with interference with the conjugate version of transmission signal and dividing by the power of transmission signal, if the power of transmission signal is not slowly varying.

19. The apparatus of claim 15, wherein the logic for filtering comprises:

logic for applying, for each spur frequency component of one or more spur frequency components that cause the interference, a notch filter on the received signal with narrowband interference.

20. The apparatus of claim 19, wherein the one or more spur frequency components are estimated by performing a fast Fourier transform (FFT) of the received signal with narrowband interference.

21. The apparatus of claim 15, wherein the logic for filtering comprises:

logic for applying, for each spur frequency component of one or more spur frequency components that cause the interference, an adaptive least mean square (LMS) filter on the received signal with narrowband interference.

22. The apparatus of claim 15, wherein the logic for translating the interference into the narrower frequency band comprises:

logic for descrambling and de-spreading the received signal with interference, and the apparatus further comprising:

logic for re-spreading and re-scrambling the signal without interference.

23. The apparatus of claim 15, wherein the logic for translating the interference into the narrower frequency band comprises:

logic for equalizing the received signal with interference to estimate one or more coefficients, each of the coefficients representing a fractional magnitude of one inter-sample interference (ISI) component of the transmission signal within the interference relative to a direct component of the transmission signal, if the interference comprises one or more ISI components; and logic for multiplying the received signal with interference with a conjugate version of a modified transmission signal and dividing by a power of the modified transmission signal to obtain the received signal with narrowband interference, if the power of modified transmission signal is not slowly varying, wherein the modified transmission signal comprises a sum of the direct component of transmission signal and the one or more ISI components with the estimated one or more coefficients.

24. The apparatus of claim 23, further comprising:

logic for multiplying the signal without interference with the modified transmission signal to obtain a recovered version of the received signal without the interference.

25. The apparatus of claim 15, wherein the logic for translating the interference into the narrower frequency band comprises:

logic for equalizing the received signal with interference to estimate one or more coefficients, each of the coefficients representing a fractional magnitude of one inter-sample interference (ISI) component of the transmission signal within the interference relative to a direct component of the transmission signal, if the interference comprises one or more ISI components; and logic for multiplying the received signal with interference with a conjugate version of a modified transmission signal to obtain the received signal with narrowband interference, if a power of the modified transmission signal is slowly varying, wherein the modified transmission signal comprises a sum of the direct component of transmission signal and the one or more ISI components with the estimated one or more coefficients.

26. The apparatus of claim 25, further comprising:

logic for multiplying the signal without interference with the modified transmission signal and dividing by the power of modified transmission signal to obtain a recovered version of the received signal without the interference.

27. The apparatus of claim 25, further comprising:

logic for receiving another signal of the second radio technology with other interference resulting from another transmission signal of the first radio technology;

logic for processing the other received signal by using a direct component of the other transmission signal to obtain a received signal without interference from the direct component;

logic for processing the received signal without interference from the direct component by using a first intersample interference (ISI) component of the other transmission signal to obtain a received signal without interference from the first ISI component; and logic for processing the received signal without interference from the first ISI component by using a second ISI component of the other transmission signal to obtain a received signal without interference from the second ISI component.

28. The apparatus of claim 27, further comprising:

logic for processing the received signal without interference from the second ISI component by using a third ISI component of the other transmission signal to obtain a version of the other received signal without the other interference.

29. An apparatus for wireless communications, comprising:

means for receiving a signal of a second radio technology with interference from a transmission signal of a first radio technology;

means for translating the interference into a narrower frequency band to obtain a received signal with narrowband interference; and means for filtering the received signal with narrowband interference to obtain a signal without the interference.

30. The apparatus of claim 29, further comprising:

means for multiplying the signal without interference with the transmission signal and dividing by a power of the transmission signal to obtain a recovered version of the received signal without the interference, if the power of transmission signal is slowly varying; and means for multiplying the signal without interference with the transmission signal to obtain the recovered version of received signal without the interference, if the power of transmission signal is not slowly varying.

31. The apparatus of claim 29, wherein the first radio technology comprises Wireless Wide Area Network (WWAN) technology and the second radio technology comprises Global Positioning System (GPS) technology.

32. The apparatus of claim 29, wherein the means for translating the interference into the narrower frequency band comprises:

means for multiplying the received signal with interference with a conjugate version of the transmission signal, if a power of the transmission signal is slowly varying; and means for multiplying the received signal with interference with the conjugate version of transmission signal and dividing by the power of transmission signal, if the power of transmission signal is not slowly varying.

33. The apparatus of claim 29, wherein the means for filtering comprises:

means for applying, for each spur frequency component of one or more spur frequency components that cause the interference, a notch filter on the received signal with narrowband interference.

34. The apparatus of claim 33, wherein the one or more spur frequency components are estimated by performing a fast Fourier transform (FFT) of the received signal with narrowband interference.

35. The apparatus of claim 29, wherein the means for filtering comprises:

means for applying, for each spur frequency component of one or more spur frequency components that cause the interference, an adaptive least mean square (LMS) filter on the received signal with narrowband interference.

36. The apparatus of claim 29, wherein the means for translating the interference into the narrower frequency band comprises:

means for descrambling and de-spreading the received signal with interference, and the apparatus further comprising:

means for re-spreading and re-scrambling the signal without interference.

37. The apparatus of claim 29, wherein the means for translating the interference into the narrower frequency band comprises:

means for equalizing the received signal with interference to estimate one or more coefficients, each of the coefficients representing a fractional magnitude of one intersample interference (ISI) component of the transmission signal within the interference relative to a direct component of the transmission signal, if the interference comprises one or more ISI components; and means for multiplying the received signal with interference with a conjugate version of a modified transmission signal and dividing by a power of the modified transmission signal to obtain the received signal with narrowband interference, if the power of modified transmission signal is not slowly varying, wherein the modified transmission signal comprises a sum of the direct component of transmission signal and the one or more ISI components with the estimated one or more coefficients.

38. The apparatus of claim 37, further comprising:

means for multiplying the signal without interference with the modified transmission signal to obtain a recovered version of the received signal without the interference.

39. The apparatus of claim 29, wherein the means for translating the interference into the narrower frequency band comprises:

means for equalizing the received signal with interference to estimate one or more coefficients, each of the coefficients representing a fractional magnitude of one intersample interference (ISI) component of the transmission signal within the interference relative to a direct component of the transmission signal, if the interference comprises one or more ISI components; and means for multiplying the received signal with interference with a conjugate version of a modified transmission signal to obtain the received signal with narrowband interference, if a power of the modified transmission signal is slowly varying, wherein the modified transmission signal comprises a sum of the direct component of transmission signal and the one or more ISI components with the estimated one or more coefficients.

40. The apparatus of claim 39, further comprising:
means for multiplying the signal without interference with the modified transmission signal and dividing by the power of modified transmission signal to obtain a recovered version of the received signal without the interference.

41. The apparatus of claim 39, further comprising:
means for receiving another signal of the second radio technology with other interference resulting from another transmission signal of the first radio technology;
means for processing the other received signal by using a direct component of the other transmission signal to obtain a received signal without interference from the direct component;
means for processing the received signal without interference from the direct component by using a first inter-sample interference (ISI) component of the other transmission signal to obtain a received signal without interference from the first ISI component; and
means for processing the received signal without interference from the first ISI component by using a second ISI component of the other transmission signal to obtain a received signal without interference from the second ISI component.

42. The apparatus of claim 41, further comprising:
means for processing the received signal without interference from the second ISI component by using a third ISI component of the other transmission signal to obtain a version of the other received signal without the other interference.

43. A computer-program storage apparatus for wireless communications comprising a memory having one or more software modules stored thereon, the one or more software modules being executable by one or more processors and the one or more software modules comprising:
instructions for receiving a signal of a second radio technology with interference from a transmission signal of a first radio technology;
instructions for translating the interference into a narrower frequency band to obtain a received signal with narrowband interference; and
instructions for filtering the received signal with narrowband interference to obtain a signal without the interference.

44. The computer-program storage apparatus of claim 43, wherein the instructions further comprise:
instructions for multiplying the signal without interference with the transmission signal and dividing by a power of the transmission signal to obtain a recovered version of the received signal without the interference, if the power of transmission signal is slowly varying; and
instructions for multiplying the signal without interference with the transmission signal to obtain the recovered version of received signal without the interference, if the power of transmission signal is not slowly varying.

45. The computer-program storage apparatus of claim 43, wherein the first radio technology comprises Wireless Wide Area Network (WWAN) technology and the second radio technology comprises Global Positioning System (GPS) technology.

46. The computer-program storage apparatus of claim 43, wherein the instructions for translating the interference into the narrower frequency band comprise:
instructions for multiplying the received signal with interference with a conjugate version of the transmission signal, if a power of the transmission signal is slowly varying; and
instructions for multiplying the received signal with interference with the conjugate version of transmission signal and dividing by the power of transmission signal, if the power of transmission signal is not slowly varying.

47. The computer-program storage apparatus of claim 43, wherein the instructions for filtering comprise:
instructions for applying, for each spur frequency component of one or more spur frequency components that cause the interference, a notch filter on the received signal with narrowband interference.

48. The computer-program storage apparatus of claim 47, wherein the one or more spur frequency components are estimated by performing a fast Fourier transform (FFT) of the received signal with narrowband interference.

49. The computer-program storage apparatus of claim 43, wherein the instructions for filtering comprise:
instructions for applying, for each spur frequency component of one or more spur frequency components that cause the interference, an adaptive least mean square (LMS) filter on the received signal with narrowband interference.

50. The computer-program storage apparatus of claim 43, wherein the instructions further comprise:
instructions for descrambling and de-spreading the received signal with interference; and
instructions for re-spreading and re-scrambling the signal without interference.

51. The computer-program storage apparatus of claim 43, wherein the instructions for translating the interference into the narrower frequency band comprise:
instructions for equalizing the received signal with interference to estimate one or more coefficients, each of the coefficients representing a fractional magnitude of one inter-sample interference (ISI) component of the transmission signal within the interference relative to a direct component of the transmission signal, if the interference comprises one or more ISI components; and
instructions for multiplying the received signal with interference with a conjugate version of a modified transmission signal and dividing by a power of the modified transmission signal to obtain the received signal with narrowband interference, if the power of modified transmission signal is not slowly varying,
wherein the modified transmission signal comprises a sum of the direct component of transmission signal and the one or more ISI components with the estimated one or more coefficients.

52. The computer-program storage apparatus of claim 51, wherein the instructions further comprise:
instructions for multiplying the signal without interference with the modified transmission signal to obtain a recovered version of the received signal without the interference.

53. The computer-program storage apparatus of claim 43, wherein the instructions for translating the interference into the narrower frequency band comprise:
instructions for equalizing the received signal with interference to estimate one or more coefficients, each of the coefficients representing a fractional magnitude of one inter-sample interference (ISI) component of the transmission signal within the interference relative to a direct component of the transmission signal, if the interference comprises one or more ISI components; and instructions for multiplying the received signal with interference with a conjugate version of a modified transmission signal to obtain the received signal with narrowband interference, if a power of the modified transmission signal is slowly varying, wherein the modified transmission signal comprises a sum of the direct component of transmission signal and the one or more ISI components with the estimated one or more coefficients.

54. The computer-program storage apparatus of claim 53, wherein the instructions further comprise:

instructions for multiplying the signal without interference with the modified transmission signal and dividing by the power of modified transmission signal to obtain a recovered version of the received signal without the interference.

55. The computer-program storage apparatus of claim 53, wherein the instructions further comprise:

instructions for receiving another signal of the second radio technology with other interference resulting from another transmission signal of the first radio technology;

instructions for processing the other received signal by using a direct component of the other transmission signal to obtain a received signal without interference from the direct component;

instructions for processing the received signal without interference from the direct component by using a first inter-sample interference (ISI) component of the other transmission signal to obtain a received signal without interference from the first ISI component; and instructions for processing the received signal without interference from the first ISI component by using a second ISI component of the other transmission signal to obtain a received signal without interference from the second ISI component.

56. The computer-program storage apparatus of claim 55, wherein the instructions further comprise:

instructions for processing the received signal without interference from the second ISI component by using a third ISI component of the other transmission signal to obtain a version of the other received signal without the other interference.

* * * * *